United States Patent Office 3,447,896
Patented June 3, 1969

3,447,896
REMOVAL OF HALIDE IONS FROM CRUDE LITHIUM ALUMINATE
Norman L. Piegols and Charles K. Bon, Midland, Mich., assignors to The Dow Chemical Company, Midland, Mich.
No Drawing. Filed Oct. 5, 1966, Ser. No. 584,330
Int. Cl. C01f 7/04; C01d 1/28
U.S. Cl. 23—52                                    6 Claims

ABSTRACT OF THE DISCLOSURE

Crude lithium aluminate, containing 7–20% by weight of chemically combined chloride, is roasted with substantially stoichiometric amount of alkali metal hydroxide, based on the chloride, at 450° C. or higher. The chemically combined chloride is converted to a water-soluble alkali metal chloride which is leached out of the lithium aluminate with water.

---

This invention relates to a method of removing halide ions from crude lithium aluminate by roasting with an alkali metal hydroxide and leaching with water, and more particularly pertains to a method of converting inorganic halides to water-soluble alkali metal halides by heating to 450° C. or higher, a mixture of a solid, crude lithium aluminate with an alkali metal hydroxide, in which the alkali metal has an atomic number of 3 or higher, and leaching the lithium aluminate with water to dissolve out the alkali metal halide that is formed.

Lithium aluminate contaminated with considerable amount of halide salts can be obtained from lithium-containing brines. One such brine contains .03% LiCl, 17.6% $CaCl_2$, 3.14% $MgCl_2$, 5.56% NaCl and 1.37% KCl. For example, lithium aluminate containing 7–20% of chemically combined chloride can be obtained from chloride brines of the above composition by adding a water-soluble aluminum salt or a water-soluble alkali metal aluminate to the brine. A crude lithium aluminate containing such large amounts of chloride contaminant cannot be employed as a lithium aluminate source in a number of applications. In making lithium containing glass, chlorides or other halides are detrimental because they may be at least partially volatilized at the temperature employed, thus producing noxious and corrosive fumes and making it difficult to make melts of uniform composition.

The amount of alkali metal hydroxide needed is that calculated as sufficient to react with the halide content of the crude lithium aluminate to convert the hydroxide to its alkali metal salt. This amount of alkali metal hydroxide can be defined as substantially a stoichiometric quantity based on the halide ion contaminant. Quantities appreciably less than stoichiometric will not convert enough halide ion to alkali metal halide and thus the desired degree of purity is not obtained. An excess of this hydroxide may tend to dissolve the aluminate or convert a portion of it to the aluminate.

The mixture of alkali metal hydroxide and crude lithium aluminate must be heated to about 450° C. for the reaction to go to completion in a reasonable time. Higher temperatures up to about 800° C. can also be employed, but offer no particular advantages.

The alkali metal hydroxides which can be used include lithium, sodium, potassium, cesium and rubidium hydroxides. The sodium and potassium hydroxide are preferred, and most preferred is sodium hydroxide because of its low cost and easy availability. The alkali metal hydroxide can be used dry, as a hydrate or in a strong solution of 25% by weight or more in a solvent, preferably water. A solution of the alkali-metal hydroxide is desirable to distribute the alkaline ingredient in direct contact with the entire mass of crude lithium aluminate. The quantity of aqueous alkali metal hydroxide solution, however, should be adjusted so that it contains substantially a stoichiometric quantity of the hydroxide needed to react with the halide in the crude aluminate. Since the wet mixture resulting from the addition of the aqueous solution is desirably dried before roasting, it is preferred to have no more liquid than necessary to form a paste. By operating in this manner the lithium aluminate will remain essentially completely insoluble. If a dry blend of alkali metal hydroxide and crude lithium aluminate is employed, the particles should be relatively fine.

The examples which follow are intended to illustrate the invention, but not to limit it.

Example 1

A mixture of 9.1 parts of lithium aluminate containing 14.5% by weight of chloride was mixed with 2.73 weight parts of NaOH in the form of a 50 weight percent aqueous solution. The mixture was dried at 120° C. and then heated to 450° C. for one hour. The sample was then ground and added to 50 weight parts of water. The slurry was permitted to stand for 30 minutes and then was filtered, washed and dried. On analysis the recovered lithium aluminate was found to contain .09% chloride. The leach liquid was analyzed after filtration and was found to contain .4% of the original lithium.

Example 2

To 8.32 parts by weight of crude lithium aluminate were added 1.66 weight parts of NaOH dissolved in sufficient water to make a 50 weight percent solution. The mixture was stirred to form a paste, which was dried in an oven for 30 minutes at 120° C. and then placed in a muffle furnace at 800° C. for one hour. The treated sample was then ground and slurried with 50 ml. water and stirred for a half-hour. The slurry was then filtered. The filtrate contained only .01% by weight Li and substantially all the chloride.

For comparative purposes 12.2 weight parts of crude lithium aluminate were mixed with 2.44 weight parts of NaOH, provided as a 50 weight percent aqueous solution, and the paste was dried as stated in Example 2. The sample was then heated to 300° C. for one hour. The treated lithium aluminate was ground and slurried with 50 ml. water, stirred for a half-hour, and then filtered. The insoluble portion on analysis was found to contain 2.9% Cl. This shows that the reaction at 300° C. was incomplete.

In another test 11.5 parts of crude lithium aluminate without alkali addition was roasted for one hour at 800° C. After grinding, the heat treated material was slurried with 50 ml. water, stirred for 30 minutes and filtered. The filtrate contained .78% Li and only about 4.4% Cl. This indicates that a considerable portion of the crude lithium aluminate was converted to LiCl which was dissolved by the water.

The substitution of the alkali metal hydroxides in equivalent quantities for NaOH gives substantially the same results.

We claim:
1. A method of removing chloride ions from crude lithium aluminate contaminated with said chloride ions comprising, admixing said crude lithium aluminate with substantially a stoichiometric quantity of an alkali metal hydroxide based on the amount of chloride ion contaminant, heating the mixture to a temperature of at least about 450° C. to effect a reaction between said hydroxide and the said chloride ions, and dissolving the formed alkali metal chloride from the mixture with water.

2. The method of claim 1 in which the alkali metal hydroxide is potassium hydroxide.

3. The method of claim 1 in which the alkali metal hydroxide is sodium hydroxide.

4. The method of claim 1 in which the chloride contaminant represents 7–20% by weight of the crude lithium aluminate.

5. The method of claim 1 in which the mixture is heated to a temperature of 450–500° C.

6. The method of claim 1 in which the lithium aluminate contains chemically combined chloride.

References Cited

UNITED STATES PATENTS

| | | | |
|---|---|---|---|
| 2,926,069 | 2/1960 | Perrin et al. | 23—52 |
| 2,964,381 | 12/1960 | Goodenough | 23—25 |
| 3,306,700 | 2/1967 | Neipert et al. | 23—25 |

HERBERT T. CARTER, *Primary Examiner.*

U.S. Cl. X.R.

23—89